US011509470B1

(12) United States Patent
Gharibi et al.

(10) Patent No.: US 11,509,470 B1
(45) Date of Patent: Nov. 22, 2022

(54) SYSTEMS AND METHODS FOR PROVIDING A PRIVACY-PRESERVING TRAINING APPROACH IN BLIND LEARNING WITH SECURE ENCLAVES

(71) Applicant: TripleBlind, Inc., Kansas City, MO (US)

(72) Inventors: Gharib Gharibi, Overland Park, KS (US); Babak Poorebrahim Gilkalaye, Kansas City, MO (US); Andrew Rademacher, Kansas City, MO (US); Riddhiman Das, Parkville, MO (US); Steve Penrod, Kansas City, MO (US); David Wagner, Shawnee, KS (US)

(73) Assignee: TripleBlind, Inc., Kansas City, MO (US)

( * ) Notice: Subject to any disclaimer, the term of this patent is extended or adjusted under 35 U.S.C. 154(b) by 0 days.

(21) Appl. No.: 17/744,038

(22) Filed: May 13, 2022

(51) Int. Cl.
*H04L 9/08* (2006.01)
*G06K 9/62* (2022.01)
*H04L 9/32* (2006.01)

(52) U.S. Cl.
CPC .......... *H04L 9/0894* (2013.01); *G06K 9/6257* (2013.01); *H04L 9/3215* (2013.01); *H04L 2209/46* (2013.01)

(58) Field of Classification Search
CPC . H04L 9/0894; H04L 9/3215; H04L 2209/46; G06K 9/6257
See application file for complete search history.

(56) References Cited

U.S. PATENT DOCUMENTS

| 11,010,495 B1 * | 5/2021 | McArdle | G06F 9/4552 |
| 2022/0029971 A1 * | 1/2022 | Gharibi | G06Q 30/0623 |

* cited by examiner

*Primary Examiner* — Mohammad W Reza

(57) ABSTRACT

A system and method are disclosed for providing a privacy-preserving training approach for split learning methods, including blind learning. A method includes receiving, at a server device, encrypted smashed data from a client device, using a secure enclave on the server device, moving, on the server device, a server model, the encrypted smashed data and computer code for a blind learning operation into the secure enclave, performing, in the secure enclave, forward propagation using the decrypted smashed data to generate predicted values, comparing the predicted values to true labels using a loss function to yield a loss value, repeating the comparing step for all smashed data received at the server device from a plurality of clients to yield a plurality of loss values, averaging the plurality of loss values to yield an average loss value, updating model weights of the server model using the average loss value to yield gradients of the smashed data and transmitting the gradients of the smashed data to the client device.

20 Claims, 4 Drawing Sheets

SYSTEMS AND METHODS FOR PROVIDING A PRIVACY-PRESERVING TRAINING APPROACH IN BLIND LEARNING WITH SECURE ENCLAVES

TECHNICAL FIELD

The present disclosure generally relates to split learning and federated learning approach with the additional feature of a privacy-preserving blind learning approach with secure enclaves configured on one or more of a server device and a client device.

BACKGROUND

Distributed learning methods, including Split Learning (SL) and Federated Learning (FL), can facilitate the training of a global model from several decentralized datasets. However, while these methods can preserve some level of privacy for the training data since they do not require moving it outside the owner's organization, they still exchange intermediate updates with the server to train the global model. A malicious server can use these intermediate updates, known as smashed data in the SL paradigm, to carry out data reconstruction attacks or model inversion attacks to reconstruct some of the original training data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

INTRODUCTION

Figure 1:
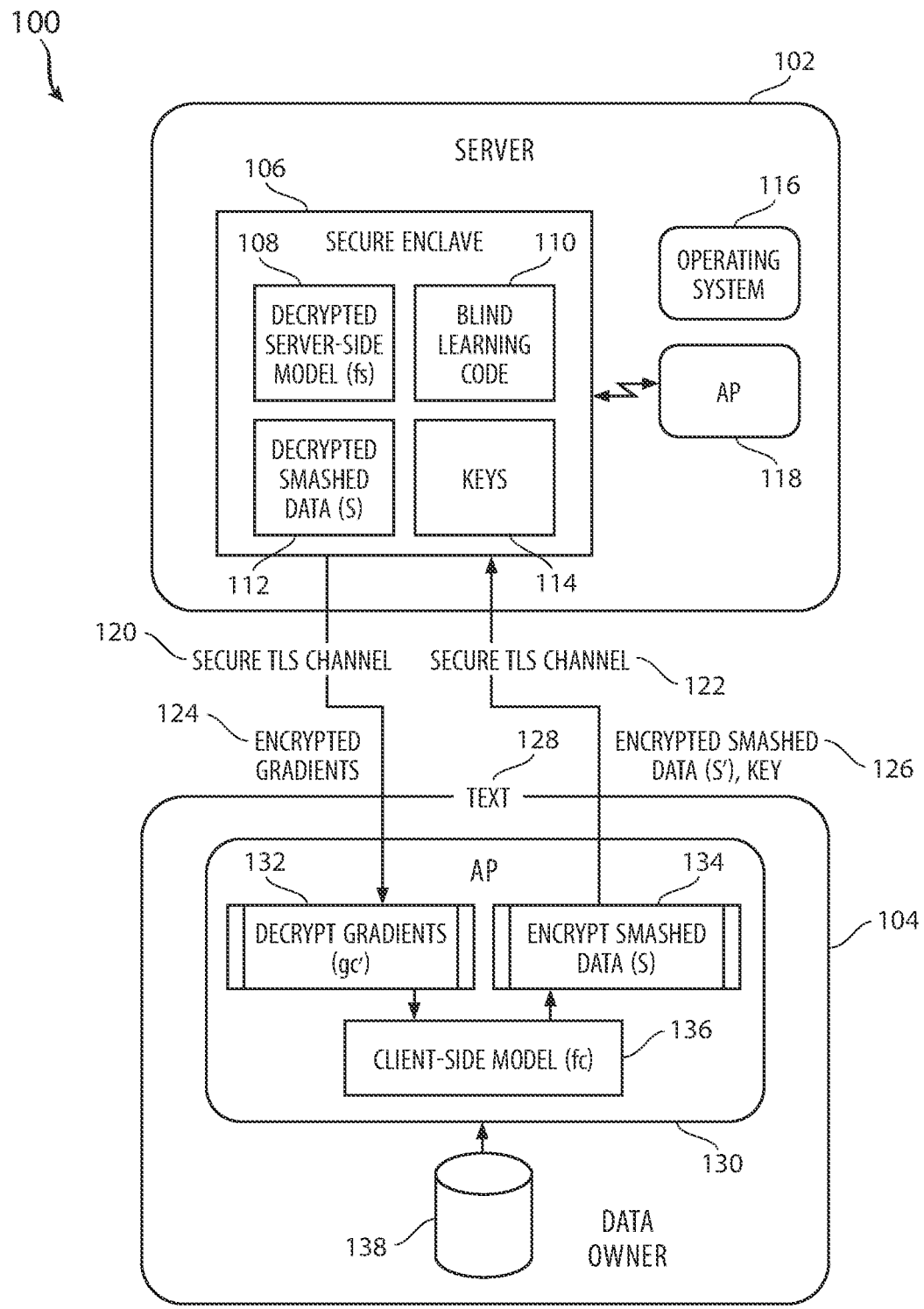
FIG. 1 illustrates the use of secure enclaves at a server and a client.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the following description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

BRIEF DESCRIPTION

In order to address the issue raised above, this disclosure introduces several solutions. A possible solution to mitigate reconstruction attacks (also called model inversion attacks) from smashed data is to utilize a secure enclave at the server side to prevent malicious servers from reconstructing the original training data. A secure enclave refers to a hardware-based solution that provides trusted environments to execute secret code on private data while maintaining their privacy, even when the underlying platform is malicious or compromised. In particular, these secure enclaves designate a secure memory region to execute code on secret data in discrete isolation from the external programs and operating system. The code loaded in the secure enclave can access data loaded into it while external applications (including the operating system of the hosting machine) cannot access the data inside the secure enclave except via statically defined interfaces. Data and secret code flow through the operating system in an encrypted form only.

To this end, this disclosure provides an innovative, end-to-end, privacy-preserving approach for training neural networks from decentralized datasets. See FIG. 1 for an example system 100 having a server device 102 and a client device 104 or data owner. The client device 104 can also represent a plurality of client devices each of which can have private data and in some instances each of which can host a respective secure enclave. A secure enclave mainly refers to a hardware that must exist on a hosting machine. The system 100 provides a privacy-preserving blind learning approach using secure enclaves. The approach builds on a previous innovation called Blind Learning (BL). Specifically, BL splits the global neural network (0 into two consecutive sub-networks (or models) at a specific layer called the split layer. These two sub-networks can include: a client-side model (fc) 136 and a server-side model (fs) 108. These two models operate together to mirror the stochastic gradient descent learning approach on the global model f; i.e., $f(x)=(fs \circ fc)(x)=fs(fc(x))$, where x is a training sample or batch of samples.

The output of the client-side model 136 is called smashed data $(fc(x)=S)$ 126 and it is sent during the forward propagation process to the server 102. The server 102 uses the smashed data 112 to run a forward propagation step that produces the predictions $(fs(S)=y')$, calculate a loss function, and run the backpropagation process on its model fs. Next, the server 102 sends the gradients of the split layer back to the client 104, which then updates its own model 126 following the gradients directions i.e., $wc=wc-a.gc$, where wc denotes the parameters of fc, a is the learning rate, and gc are the gradients 124 received from the server 102. This process is then repeated for a total number of E epochs or until some condition is met (e.g., specific accuracy). An epoch is the number of iterations required to employ all samples of the dataset for training. An example of a Blind Learning approach is found in U.S. patent application Ser. No. 17/180,475, incorporated herein by reference.

A system 102 can include a processor 410, an operating system 116, a secure enclave 106 configured to operate privately of the operating system 116 and a computer-readable storage device 415 storing instructions which, when executed by the processor 410, cause the processor to perform operations including one or more of the following steps in any order: receiving smashed data 126 from a client device 104, utilizing the secure enclave 106 on the server device 102, moving a server model 108, the smashed data 112 and computer code 106 for a blind learning operation into the secure enclave 106, performing, in the secure enclave 106, forward propagation using the smashed data 112 to generate predicted values, comparing the predicted values to true labels using a loss function to yield a loss value, repeating the comparing step for all smashed data 126 received at the server device 102 from a plurality of clients 104 to yield a plurality of loss values, averaging the plurality of loss values to yield an average loss value, updating model weights of the server model 108 using the average loss value to yield gradients of the smashed data 124 and sending the gradients of the smashed data to the client device 104.

The system 100 can be the server device 102 with the operations occurring at the server device 102, the client device 104 and its operations, or a combination of both the server device 102 and the client device 104 covering the combined operations. The system 100 can also include a plurality of client devices 104.

DETAILED DESCRIPTION

As introduced above, the disclosure in this case introduces an approach to using a secure enclave 106 as shown in FIG. 1 for performing some of the processes of Blind Learning. The secure enclave in one aspect can be a dedicated secure subsystem integrated the server 102 or on a chip system of the server 102. The secure enclave 106 is isolated from the main processor and operating system 116 to provide an extra layer of security and is designed to keep sensitive user data secure even when the application processor 118 kernel becomes compromised.

Figure 2:
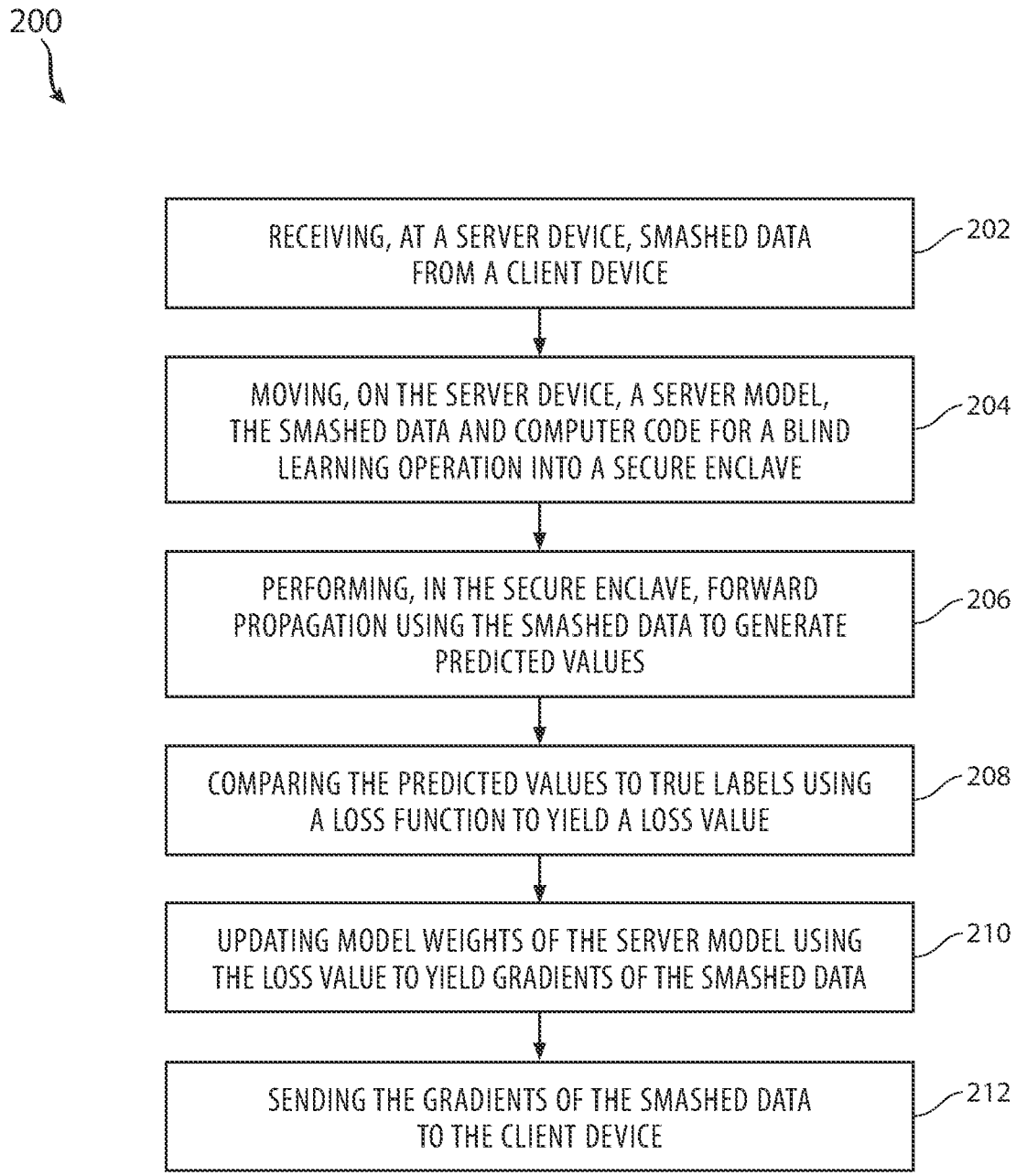
FIG. 2 illustrates a method embodiment.
Figure 3:
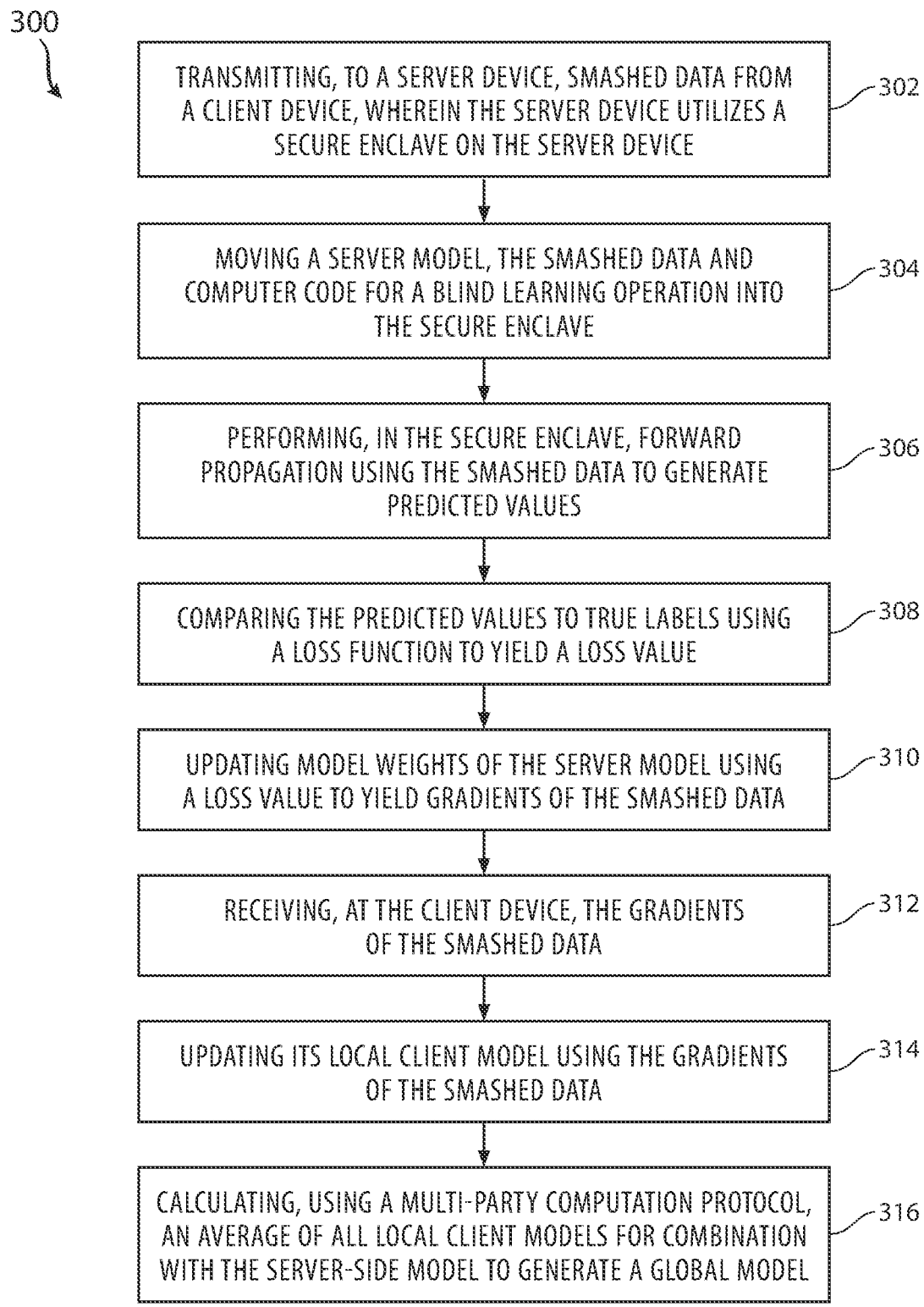
FIG. 3 illustrates another method embodiment.

A detailed example of how this process works shall be explained with respect to FIGS. 1-3. The problem with the aforementioned approach is that smashed data generated at the client is sent in plain-text 128 to the server 102, which then can be used by a malicious server to carry out data reconstruction attacks. Part of the goal of the system is to ultimately train a global model while preserving the privacy of the owner data 138 at the client device 104. To address this problem, this disclosure introduces a privacy-preserving Split Learning with a secure enclave 106. The disclosure generalizes this method and describes it using a specific version of Split Learning called Blind Learning (BL).

The client 104 starts the forward propagation process to produce the smashed data S 124 from its model fc 136. This can be performed as part of an application 130 operating on the client 104 or the data owner. The client 104 uses a cryptographic key generation process (such as Diffie-Hellman or other key generation process) to generate a secret key and uses it to encrypt its smashed data to create S' 126. The encrypted smashed data, S' 126, is then uploaded to the server 102 through a secure TLS (transport layer security) or secure sockets layer (SSL) channel 122. The server 102 can use keys 114 to decrypt the smashed data to yield decrypted smashed data 112. The smashed data is decrypted inside the secure enclave only.

The server 102 utilizes a secure enclave 106 and moves into it: (1) the server model fs 108, (2) the received encrypted smashed data 112, and (3) computer code for BL 110. Cryptographic keys 114 can also be moved into the secure enclave 106. An attestation process can optionally take place to attest the integrity of the server-side model (fs) 108, the computer code for BL 106, and the smashed data 112 to ensure that the server included the correct model and smashed data. Note that the secure enclave 106 is separate from the operating system 116 and application processor 118.

If the attestation process, when it is used, is completed and is successful, the server 102 can start the forward propagation step inside the enclave 106 using the decrypted smashed data 112; i.e., fs(Sk) 108, where Sk is the set of smashed data received from the client k 104. The forward propagation step generates the predicted values y'k. Next, these values are compared to the true labels y using a loss function L(y', y). This step is repeated for the set S of all smashed data received at the server 102: S={Sk|k∈[1, K], where k is an integer, and where K is the total number of clients}.

Loss values are then averaged using a weighted average function $$J = \sum_{i=1}^{i=k} \left(\frac{n}{m}\right) Li$$

where n is the number of data samples per set of smashed data (n=|Sk|), and m is the total number of data samples per forward propagation step from all clients (m=$\sum_{i=1}^{i=k}$ |Sk|), and L is the loss value per smashed data.

An alternative step follows. If the computational power at the server 102 and its secure enclave 106 allows to stack all smashed data 112 into a single batch, then the forward propagation step can be carried out in a single step: Y'→fs (S) where S is a single batch composed by stacking all smashed data from all clients together. In that case, the loss value at the server will be given by J=L (Y, Y').

Using J (the loss value), the server 102 updates its model weights 108 in a stochastic gradient method ws:=ws−a.∇ fs, where ∇fs is the gradients at the server side. This step also produces the gradients of the smashed data layer (gc). The secure enclave 106 encrypts the gradients of the smashed data (gc) and sends the encrypted gradients 124 to all clients 104 over a secure TLS channel 120 (or SSL channel).

Each client 104 receives the encrypted gradients 124, decrypts them 132, and uses them to update their local model 136 as follows: wc:=wc−η≡(gc; fc) where η is the learning rate at the client side 104 and ∇(gc; fc) represents the gradients of the client model computed starting with the gradients of the smashed data layer.

After each t rounds (t is a hyperparameter defined by the user, where 0≤t≤E and E is the number of training epochs), the client device 104 uses a multi-party computational averaging protocol to average all client-side models 136. This step can also be carried out in the same manner described above using the secure enclave 106 at the server device 102. This is possible given that the enclave page cash (EPC) can fit all the client-side models 136. Even when the EPC cannot fit all of the models at once, the system can still use secure enclaves 106 to average these models by averaging one client-side model 136 at a time with a base model. Alternatively, we can average the models layer-wise: one layer at a time.

When the training is complete, the client-side model 136 will be attached to the server-side model 108 to generate a global model.

If the model architecture itself is to be protected, then the client 104 can also use secure enclaves (not shown) at its side to produce the smashed data 134, without being able to see their side of the model (fc). In this case, then FIG. 1 could be modified to include a secure enclave with a similar secure structure that the secure enclave 106 discussed above for the server 102.

FIG. 2 illustrates a method embodiment from the standpoint of the server 102 performing operations as disclosed herein. The method 200 includes one or more of the following steps in any order: receiving, at a server device 102, smashed data 126 from a client device 104 (202), moving, on the server device 102, one or more of a server model 108, the smashed data 126 and computer code 110 for a blind learning operation into a secure enclave on the server device 106 (204), performing, in the secure enclave 106, forward propagation using the smashed data 112 to generate predicted values (206), comparing the predicted values to true labels using a loss function to yield a loss value (210), updating model weights of the server model 108 using the loss value to yield gradients of the smashed data (212) and sending the gradients of the smashed data to the client device 104 (214).

The loss value may be different types of loss value. For example, an average loss value can be obtained by repeating the comparing step for all smashed data 112 received at the server device 102 from a plurality of clients 104 to yield a plurality of loss values and then averaging the plurality of loss values to yield an average loss value. The loss value may be based on other data as well and may not be an average loss value.

The method can also include receiving encrypted smashed data 126 at the server device 102 and providing the encrypted smashed data 126 to the secure enclave 106 where it can be decrypted for further processing to yield decrypted smashed data 112. The method can further include encrypting in the secure enclave 106 the gradients of the smashed data and transmitting the encrypted smashed data 124 to one or more clients 104.

Each client 104 uses the received gradients 124 and updates their local client-side model 136. After a certain number of rounds of training, the respective clients 104 can use a multi-party computation protocol to average all client-side models 136 and the final client-side model can be attached to the service side model 108 to generate a global model. In one aspect, the operation on the client device 104 can also occur in a secure enclave. Alternatively, the models could also be averaged inside the secure enclave 106 of the server without requiring the secure multi-party compute protocol.

The method can also include performing an attestation process to confirm the integrity of one or more of the server model 108, the smashed data 112 and the computer code 110 moved to the secure enclave 106.

FIG. 3 illustrates the processes of a method 300 from the standpoint of the client device 104. The method 300 includes one or more steps as follows: transmitting, to a server device 102, smashed data 126 from a client device 104, wherein the server device 102 utilizes a secure enclave 106 on the server device 102 (302). The server devices 102 moves one or more of a server model 108, the smashed data 112 and computer code for a blind learning operation 110 into the secure enclave 106 (304) and performs, in the secure enclave 106, forward propagation using the smashed data to generate predicted values (306) and compares the predicted values to true labels using a loss function to yield a loss value (308). The server device 102 updates model weights of the server model 108 using a loss value to yield gradients of the smashed data 124 (310). The method further includes receiving, at the client device 104, the gradients of the smashed data 124 (312). The client device 104 can then updates its local client model 136 using the gradients of the smashed data 124 (314) and calculates, using a multi-party computation protocol, an average of all local client models for combination with the server-side model 108 to generate a global model (316).

In one example, the loss value can be determined by the server device 102 repeating the comparing step for all smashed data 126 received at the server device 102 from a plurality of clients 104 to yield a plurality of loss values and averaging the plurality of loss values to yield an average loss value. An "average" loss value is one example, but other approaches may be used to determine the loss value and it does not have to be an average value. For example, alternatively, the system may aggregate a plurality of loss values, such as by stacking the smashed data into a single batch in order to calculate a single loss value.

Figure 4:
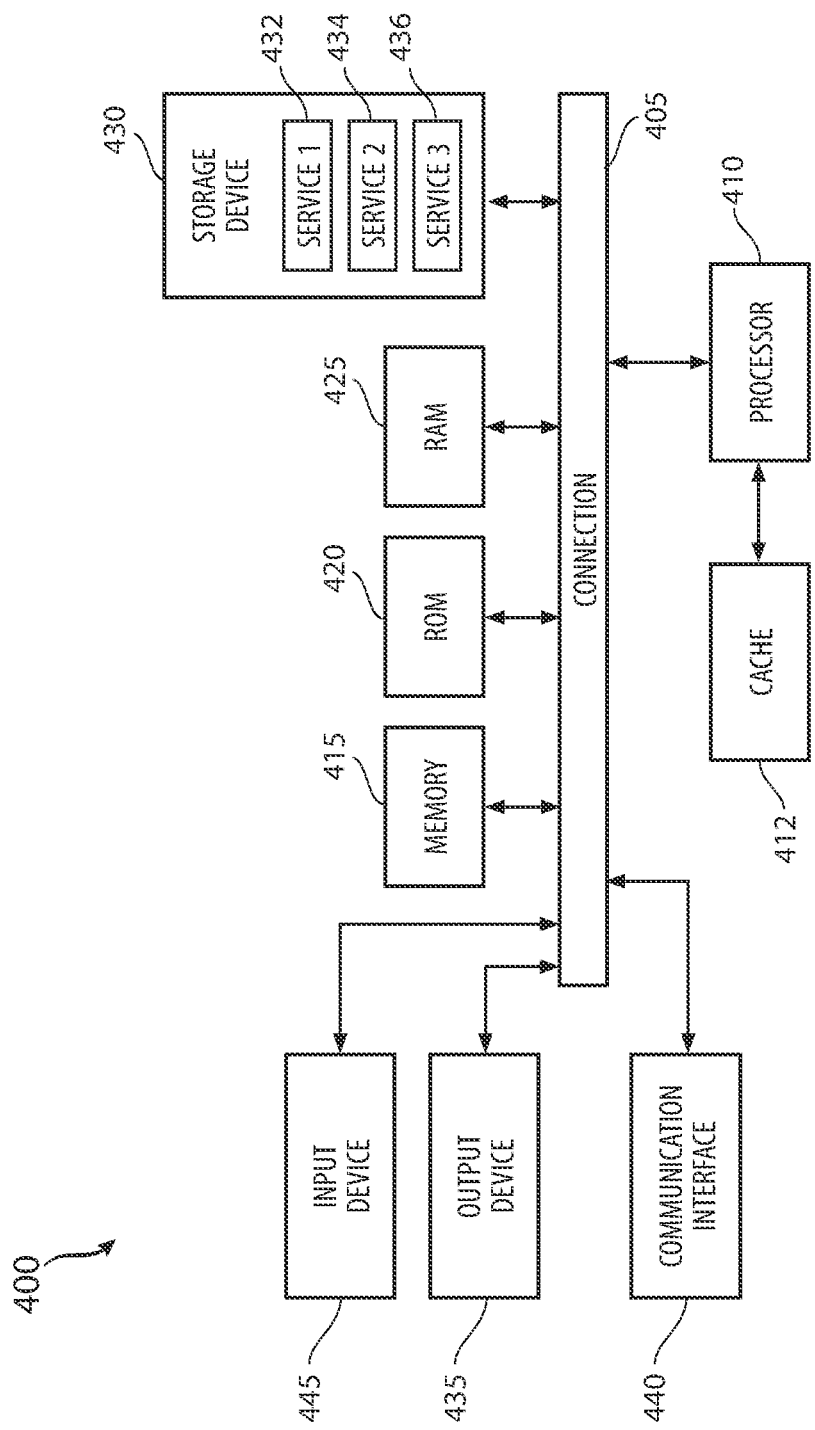
FIG. 4 illustrates an example system embodiment.

FIG. 4 illustrates example computer device that can be used in connection with any of the systems disclosed herein. In this example, FIG. 4 illustrates a computing system 400 including components in electrical communication with each other using a connection 405, such as a bus. System 400 includes a processing unit (CPU or processor) 410 and a system connection 405 that couples various system components including the system memory 415, such as read only memory (ROM) 420 and random-access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general-purpose processor and a hardware or software service or module, such as service (module) 1 432, service (module) 2 434, and service (module) 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric.

To enable user interaction with the device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services or modules 432, 434, 436 for controlling the processor 410. Other hardware or software modules are contemplated. The storage device 430 can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

We claim:

1. A method comprising:
receiving, at a server device, smashed data from a client device;
moving, on the server device, a server model, the smashed data and computer code for a split learning operation into a secure enclave on the server device;
performing, in the secure enclave, forward propagation using the smashed data to generate predicted values;
comparing the predicted values to true labels using a loss function to yield a loss value;
updating model weights of the server model using a loss value to yield gradients of the smashed data; and
sending the gradients of the smashed data to the client device.

2. The method of claim 1, further comprising:
receiving encrypted smashed data at the server device; and
providing the encrypted smashed data to the secure enclave where it can be decrypted for further processing.

3. The method of claim 1, further comprising:
encrypting, in the secure enclave, the gradients of the smashed data to yield encrypted smashed data; and
transmitting the encrypted smashed data to the client device.

4. The method of claim 1, wherein the client device uses the received gradients and updates a local client-side model.

5. The method of claim 1, further comprising:
after a certain number of rounds of training, applying, at the client device, a multi-party computation protocol to average all client-side models.

6. The method of claim 5, further comprising:
attaching a final client-side model to the service side model to generate a global model.

7. The method of claim 1, further comprising performing an attestation process to confirm the integrity of one or more of the server model, the smashed data and the computer code moved to the secure enclave.

8. A method comprising:
transmitting, to a server device, smashed data from a client device, wherein the server device:
moves a server model, the smashed data and computer code for a blind learning operation into a secure enclave on the server device;
performs, in the secure enclave, forward propagation using the smashed data to generate predicted values;
compares the predicted values to true labels using a loss function to yield a loss value;
updates model weights of the server model using a loss value to yield gradients of the smashed data;
receiving, at the client device, the gradients of the smashed data; and
updating a local client model using the gradients of the smashed data.

9. The method of claim 8, wherein the method is performed in a client device secure enclave.

10. The method of claim 8, further comprising:
calculating, using a multi-party computation protocol, an average of all local client models from the plurality of client devices for combination with the server-side model to generate a global model.

11. The method of claim 9, wherein the smashed data comprises encrypted smashed data.

12. The method of claim 11, wherein the encrypted smashed data is transmitted across a secure channel to the server device.

13. A system comprising:
a processor;
an operating system;
a secure enclave configured to operate independent of the operating system; and
a computer-readable storage device storing instructions which, when executed by the processor, cause the processor to perform operations comprising:
receiving smashed data from a client device;
moving a server model, the smashed data and computer code for a blind learning operation into a secure enclave configured on the system;
performing, in the secure enclave, forward propagation using the smashed data to generate predicted values;
comparing the predicted values to true labels using a loss function to yield a loss value;
updating model weights of the server model using a loss value to yield gradients of the smashed data; and
transmitting the gradients of the smashed data to the client device.

14. The system of claim 12, wherein the computer-readable storage device stores additional instructions which, when executed by the processor, cause the processor to perform operations further comprising:
receiving encrypted smashed data at the server device; and
providing the encrypted smashed data to the secure enclave where it can be decrypted for further processing.

15. The system of claim 12, wherein the computer-readable storage device stores additional instructions which, when executed by the processor, cause the processor to perform operations further comprising:
encrypting, in the secure enclave, the gradients of the smashed data to yield encrypted gradients of the smashed data; and
transmitting the encrypted gradients of the smashed data to the client device.

16. The method of claim 1, wherein the client device uses the gradients of the smashed data and updates a local client-side model.

17. The system of claim 12, wherein the computer-readable storage device stores additional instructions which, when executed by the processor, cause the processor to perform operations further comprising:
after a certain number of rounds of training, applying, at the client device, a multi-party computation protocol to average all client-side models.

18. The system of claim 17, wherein the computer-readable storage device stores additional instructions which, when executed by the processor, cause the processor to perform operations further comprising:
attaching a final client-side model to the service side model to generate a global model.

19. The system of claim 12, wherein operations occur on the client device are performed in a client-side secure enclave.

20. The system of claim 12, further comprising an application processor that creates the secure enclave.

* * * * *